E. J. FRAENKELL.
APPARATUS FOR MAKING HOLLOW ARTICLES FROM PLASTIC MATERIAL.
APPLICATION FILED JUNE 5, 1917.
1,273,601.
Patented July 23, 1918.
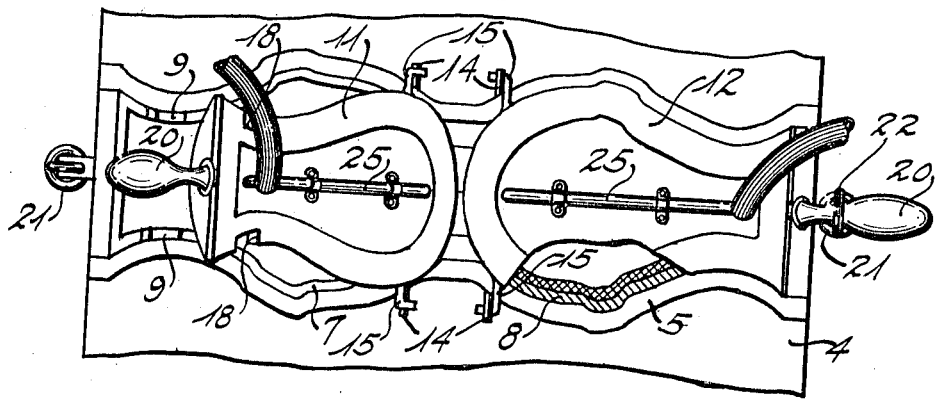
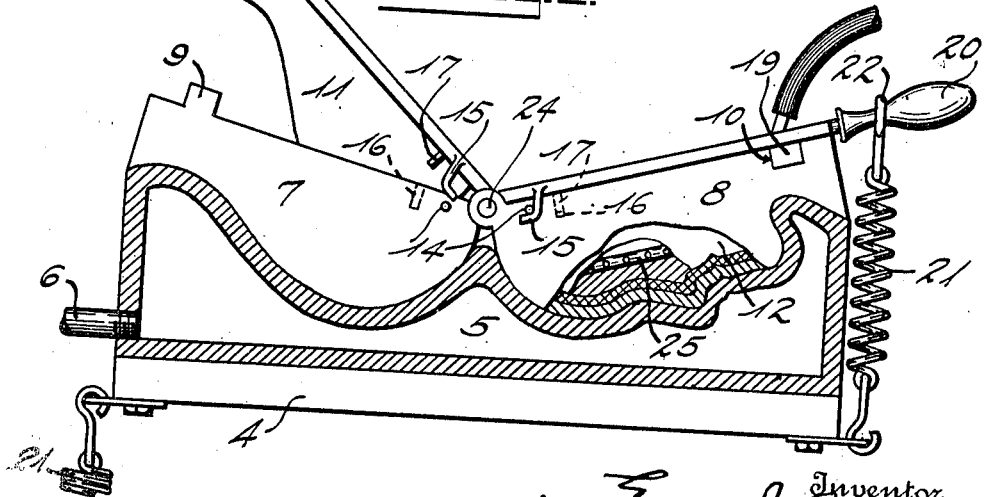

UNITED STATES PATENT OFFICE.

EUGEN J. FRAENKELL, OF NEW YORK, N. Y.

APPARATUS FOR MAKING HOLLOW ARTICLES FROM PLASTIC MATERIAL.

1,273,601.

Specification of Letters Patent. Patented July 23, 1918.

Application filed June 5, 1917. Serial No. 172,848.

*To all whom it may concern:*

Be it known that I, EUGEN J. FRAENKELL, a citizen of the United States, residing at New York, in the county of New York and State of New York, have invented certain new and useful Improvements in Apparatus for Making Hollow Articles from Plastic Material, of which the following is a specification.

This invention relates to apparatus for making hollow articles from plastic material, and one of the objects of the invention is to provide a method of cheaply and expeditiously transforming the plastic material from the mass into the finished form without requiring the aid of skilled labor.

Another object is to provide an apparatus well adapted for carrying out the method.

Other objects and aims of the invention, more or less broad than those stated above, together with the advantages inherent, will be in part obvious and in part specifically referred to in the course of the following description of the elements, combinations, arrangements of parts, and applications of principles constituting the invention; and the scope of protection contemplated will appear from the claims.

In the accompanying drawings, which are to be taken as a part of this specification, and in which I have shown a merely preferred form of embodiment of the invention, Figure 1 is a plan view of an apparatus for the practice of my invention, showing parts broken away and parts in section; and Fig. 2 is a sectional view of the same with parts in elevation.

Referring to the numerals on the drawings, there is indicated at 4 a suitable table or support upon which is a mold heater 5, which may be hollow as shown, and provided with a steam inlet 6 or the like for heating. The upper surface of this mold heater 5 will have a conformation appropriate to the article which is to be manufactured. For instance, referring to Fig. 2, the mold heater is divided into two parts, the one on the left having a conformation to correspond with the back of a doll's head, and the one on the right corresponding with the face part of a doll's head. These two parts of the mold heater receive the mold sections 7 and 8, which are also shaped to mold the back and front parts of a doll's head, respectively. The mold 7 is provided with projections 9, one on each side, and the mold 8 is provided with sockets 10, one on each side. Into the molds 7 and 8 is introduced the plastic material of which the doll's head is to be made. The material is introduced in the mass, and is to be spread out to a uniform thickness over the interior surfaces of the molds. This shaping is accomplished by means of forms 11 and 12, which are also preferably hollow and which correspond in shape to the molds 7 and 8, respectively. These forms 11 and 12 are detachably secured to the respective mold sections 7 and 8. For instance, in the drawings each mold section is shown provided on opposite sides with pins 14, and the forms are shown provided on opposite sides with hooks 15 which are to engage over the pins. In Fig. 2 the form 11 on the left is shown prior to the engagement of its hooks 15 with the pins 14 of the mold section 7, while the form 12 on the right of that figure is shown with the hooks of the form properly engaged with the pins of the mold section 8. In order to insure proper alinement of the respective forms and mold sections, each mold section may have a socket 16 and the corresponding form a projection 17 coöperating therewith. Furthermore, the form 7 on the left has on opposite sides sockets 18, with which the projections 9 of the mold section 7 may coöperate to hold the mold section 7 and the form 11 in proper alinement; while the form 12 on the right has a projection 19 to enter the socket 10 on the mold section 8. In order to hold the forms 11 and 12 in proper pressing relation within the mold sections, each form may have a handle 20, and in order that the operator may not have to hold the compression by hand, I may provide springs or the like means 21 extending from the table 4 and having hook portions 22 to engage over the handles 20. This spring connection 21 between the table and the form yieldingly holds the form in place so that in case of expansion of the plastic mass between the form and the mold section the form is allowed to move in accordance with said expansion.

Assuming that the plastic material has been properly pressed within the mold sections 7 and 8 and uniformly distributed between the mold sections and the corresponding forms so that it has received the general outlines of the two parts of the complete article, the two parts of the article are next to be joined together. Accordingly, the forms 11 and 12 are detached from the mold sections and removed, and then the mold sections, which are pivoted together as indicated at 24, are brought together, the projections 9 of the mold section 7 entering the sockets 10 of the mold section 8. These mold sections will be made so that when brought together the joint between them will be substantially tight, and so that there will be an opening defined between the outer ends of the mold sections. Through this opening fluid pressure is to be introduced into the interior, resulting in the proper union between the plastic sections of the article, the abutting edges being united under the fluid pressure and because of the plastic condition of the material. It will be understood that the material is maintained in this plastic condition because of the mold heater 5; and to assist in this heating of the material while the preliminary forming is going on, each of the hollow forms 11 and 12 may have interiorly thereof gas burners 25. Also, the fluid pressure employed in uniting the mold sections may be, for instance, steam, from which would be derived heat as well as pressure. Instead of steam or other fluid applied directly to the interior of the closed mold I might introduce a rubber bag or the like expander, shaped approximately to the interior of the mold. Where steam or the like fluid pressure is used directly provision must of course be made to back the fluid inlet.

I claim:

1. In combination, mold sections pivotally connected together, and corresponding forms detachably secured to the respective mold sections, the mold sections and forms having inter-engaging parts, and certain of said parts of the mold sections adapted for inter-engagement when the forms are detached from the mold sections and the sections are swung upon their pivots.

2. In a molding apparatus comprising a mold section, outstanding pins arranged on opposite sides at one end thereof, a corresponding form associated with the mold section provided with oppositely disposed hooks at one end adapted to engage under the pins on the mold section and at its opposite end a means for yieldingly holding the form in its proper relation to the mold section.

3. In a molding apparatus comprising a plurality of pivotally connected mold sections each section constituting a portion of a complete article, corresponding forms independently secured to the mold sections and adapted to be removed when the said sections are swung upon their pivot to bring the portions together to form the complete article.

4. In a molding apparatus comprising a mold section, a corresponding core associated therewith and having an interlocking connection at one end with said section and a yieldable connection between the core and the section at its opposite end for holding the core in its proper relation to the molding section.

In testimony whereof I affix my signature.

EUGEN J. FRAENKELL.